United States Patent [19]

Sirey

[11] 4,393,986
[45] Jul. 19, 1983

[54] SURFBOARD CARRYING RACK

[76] Inventor: Michael Sirey, 555 Banyan Tree La. #201, Delray Beach, Fla. 33444

[21] Appl. No.: 385,258

[22] Filed: Jun. 4, 1982

[51] Int. Cl.³ .......................... B62J 9/00; B62J 11/00; B62J 7/02
[52] U.S. Cl. .............................. 224/32 A; 224/32 R; 224/39; 224/42.44; 280/202; 280/289 A
[58] Field of Search ............... 224/30 R, 32 R, 32 A, 224/39, 42.03 R, 42.03 A, 42.03 B, 42.07, 42.08, 42.43, 42.44, 42.45 R, 42.39, 42.33, 42.32; 280/289 A, 202, 203, 769

[56] References Cited

U.S. PATENT DOCUMENTS

| 1,178,649 | 4/1916 | Koenis | 280/202 |
| 1,465,515 | 8/1923 | Gorrell | 224/42.33 |
| 1,532,461 | 4/1925 | Willwerscheid | 224/42.39 |
| 1,563,055 | 11/1925 | Whallon | 224/42.03 A |
| 2,109,315 | 2/1938 | Harley | 224/39 X |
| 2,432,732 | 12/1947 | Del Cano | 224/42.03 B |
| 2,552,977 | 5/1951 | Klotz | 224/42.03 B |
| 2,850,221 | 9/1958 | Brechwald | 224/39 X |
| 3,220,623 | 11/1965 | Bostwick | 224/32 R |
| 3,529,737 | 9/1970 | Daugherty | 224/42.08 X |
| 3,547,325 | 12/1970 | Hill et al. | 224/39 |
| 3,659,761 | 5/1972 | Wesson | 224/39 |
| 3,659,762 | 5/1972 | Kravitz | 224/42.03 B |
| 3,720,333 | 3/1973 | Vaughn | 224/42.03 B X |
| 3,791,563 | 2/1974 | Raat | 224/39 |
| 3,913,968 | 10/1975 | Luppens | 224/30 R X |
| 3,972,456 | 8/1976 | Saffold | 224/42.03 B |
| 4,151,939 | 5/1979 | Jorjorian et al. | 280/289 A X |
| 4,244,496 | 1/1981 | Litz | 224/32 R |
| 4,296,878 | 10/1981 | Ward et al. | 224/32 A |

FOREIGN PATENT DOCUMENTS

| 494171 | 6/1950 | Belgium | 224/30 |
| 19616 | of 1909 | United Kingdom | 280/202 |
| 391761 | 6/1933 | United Kingdom | . |
| 670466 | 4/1952 | United Kingdom | 224/39 |

Primary Examiner—Allan N. Shoap
Attorney, Agent, or Firm—Cushman, Darby & Cushman

[57] ABSTRACT

A rack for carrying one or more surfboards on a two-wheeled vehicle. Either one or two supports may be fastened to the sides of a two-wheeled vehicle, each for carrying a surfboard in a horizontal, on edge position. Each support includes a number of U-shaped frame members having corresponding portions interconnected by horizontal frame members. A portion of the frame prohibits a surfboard from sliding forward out of the support. A strap around the surfboard and frame prevent the surfboard from coming upward out of the frame. An elastic cord secured to the frame and the end of the surfboard prohibits the surfboard from sliding out of the rear of the support.

16 Claims, 5 Drawing Figures under current 4,393,986

SURFBOARD CARRYING RACK

BACKGROUND OF THE INVENTION

1. Field of the Invention

The present invention relates to racks for carrying articles, particularly surfboards, on two-wheeled vehicles.

2. Description of the Prior Art

It would be a very unusual person in this country and even in the world who is not aware of the difficult of carrying items while operating a two-wheeled vehicle. This results primarily from the fact that one's entire body is involved in operating such a vehicle. Generally, as with bicycles and motorcycles, both arms are necessary for safely steering the vehicle. With bicycles, at least both legs are necessary to power the vehicle. This leaves precious few portions of the body for carrying anything.

Human ingenuity has been brought to bear on this problem, and a number of patents have issued relating generally to carrying devices to be mounted on two-wheeled vehicles, a sampling of which are as follows:

U.S. Pat. No. 4,244,496
U.S. Pat. No. 3,913,968
U.S. Pat. No. 3,791,563
U.S. Pat. No. 3,220,623
U.S. Pat. No. 2,850,221
U.S. Pat. No. 391,761

The carriers described in the patents listed above can be classified into two general groups. U.S. Pat. Nos. 4,244,496, 2,850,221 and British Pat. No. 391,761 all relate to general carriers that can accommodate a variety of generally box-shaped items. The remaining patents all relate to specialized carriers designed to accommodate specific items such as camping gear or backpacks. None of these carriers could be employed for carrying a surfboard due to its unusual shape.

Nevertheless, two-wheeled vehicles, whether in the form of bicyles or motorcycles, are at least as popular among surfers as the public generally, and a need exists for being able to carry a surfboard while operating the vehicle. Inventors have been responsive to this need, resulting in U.S. Pat. Nos. 4,296,878, 3,659,761 and 3,547,325.

However, for a surfboard carrier to be accepted by the surfing community, at least two seemingly contradictory criteria must be met. First, the carrier must be safe. Two-wheeled vehicles are dangerous enough without increasing the hazard with a surfboard and its rack. In fact, ideally, a surfboard and its rack should enhance the safety of a two-wheeled vehicle. Second, if a surfboard carrying rack is to be accepted by surfers, it must be easy to use. Insertion and removal of the surfboard not only must be physically easy, but also take a minimum amount of time.

Unfortunately, none of the surfboard carrying racks disclosed in the patents listed above meet both these criteria. Thus, U.S. Pat. No. 4,296,878 teaches a rack for carrying a surfboard vertically at the rear of the vehicle. If the vehicle were to come to a stop suddenly, as in a crash, it appears likely that the board might come forward to strike the vehicle operator or the operator might fly back to strike the surfboard. Furthermore, when driving the vehicle down a highway, the vertical orientation of the board would appear to adversely affect the stability of the vehicle, particularly when other vehicles such as trucks are passing. These problems become particularly aggravated at the high speeds associated with motorcycle travel.

U.S. Pat. No. 3,547,325 teaches a surfboard carrying rack in which the surfboard is supported over the vehicle operator's head, parallel to the ground. With this arrangement, loading the surfboard onto the carrying rack becomes a problem in that one must attempt to place the surfboard at a high level on the rack without disturbing the balance of the vehicle. Since the surfboard is at a high level, the effects of altering wind patterns caused by trucks or the like are amplified, adversely affecting the stability of the vehicle. Furthermore, since only two straps hold the surfboard to the rack, with a sudden stop as in an accident, the surfboard might come loose. All of these problems are aggravated at high speeds associated with motorcycles.

U.S. Pat. No. 3,659,761 teaches a surfboard carrying rack which is mounted on the side of a vehicle. Two straps are employed to hold a surfboard to the rack. Again, if the vehicle were to come to a sudden stop as in an accident, it appears that the surfboard could slide forward or backward, particularly if the accident were to occur at the high speeds associated with motorcycles.

SUMMARY OF THE INVENTION

The present invention overcomes the problems discussed above by providing a rack for carrying surfboards on a two-wheeled vehicle which not only enhances the safety of operating the vehicle but also is easy and quick to use. In the present invention, a frame having a U-shaped end view is attached to the side of a two-wheeled vehicle. The frame is intended to receive the surfboard horizontally on edge. A second frame is attached to the front of the U-shaped frame for preventing the surfboard from sliding forward with respect to the vehicle.

A strap or the like cooperates with the U-shaped frame for preventing the surfboard from moving upward out of the frame. Finally, an elastic cord is looped around the end of the board and attached to the frame for preventing the board from sliding out the rear of the frame. In a preferred embodiment of the invention, not one but two frames on opposite sides of the vehicle are employed for carrying two surfboards simultaneously. In this embodiment, one of the frames may be capable of pivoting with respect to the vehicle so as to permit an operator to mount the vehicle.

The second frame for preventing the surfboard from sliding forward may take either of two forms, or both forms simultaneously. Thus, the second frame may consist of a U-shaped member disposed horizontally and positioned at a height above the center of a typical surfboard. Alternatively, the second frame may consist of a U-shaped member disposed vertically, with the height thereof being selected to be less than the height of the surfboard. Both U-shaped members can be employed simultaneously to maximize the number of different board styles that can be carried by the rack.

Since the rack of the present invention has a frame at the front for preventing the surfboard from sliding forward, and also has restraints for preventing the surfboard from coming upwardly and sliding rearwardly, the surfboard will be locked in position in all circumstances including an accident. However, since the surfboard is connected to the frame by only two straps or cords, placing the surfboard in the rack can be accomplished quickly and easily. Also, since an operator's legs are placed between the rack and the vehicle, in case of an accident, the rack and surfboard tend to protect the operator, particularly in the embodiment where two racks are employed. Finally, the open nature of the structure enables a wide variety of surfboard styles to be held by a single rack.

BRIEF DESCRIPTION OF THE DRAWINGS

These and other objects and advantages of the invention will become more apparent and more readily appreciated from the following detailed description of the presently preferred exemplary embodiment of the invention, taken in conjunction with the accompanying drawings, of which.

DETAILED DESCRIPTION OF A PREFERRED EMBODIMENT

Figure 1:
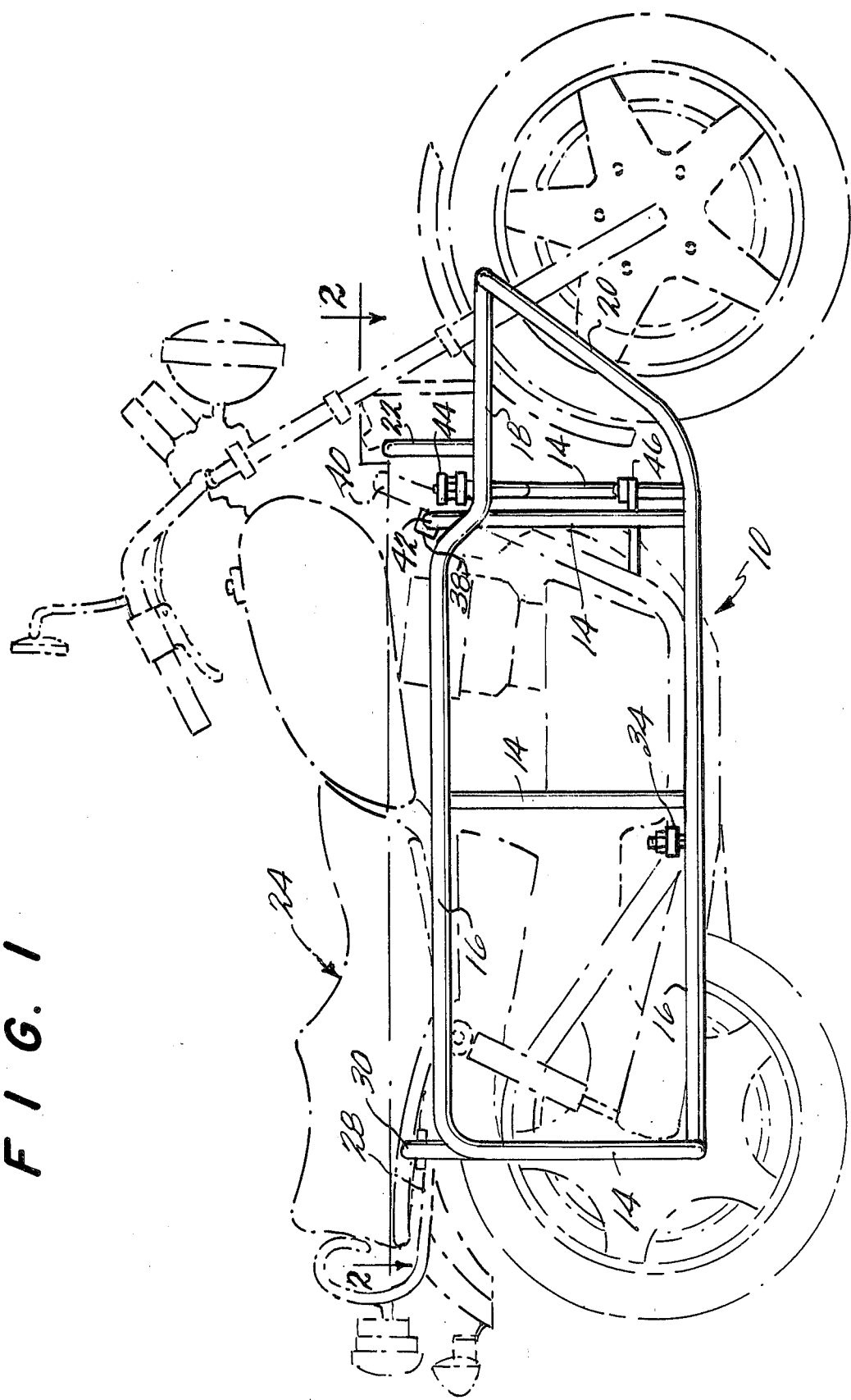
FIG. 1 is a side elevational view of the present invention.
Figure 2:
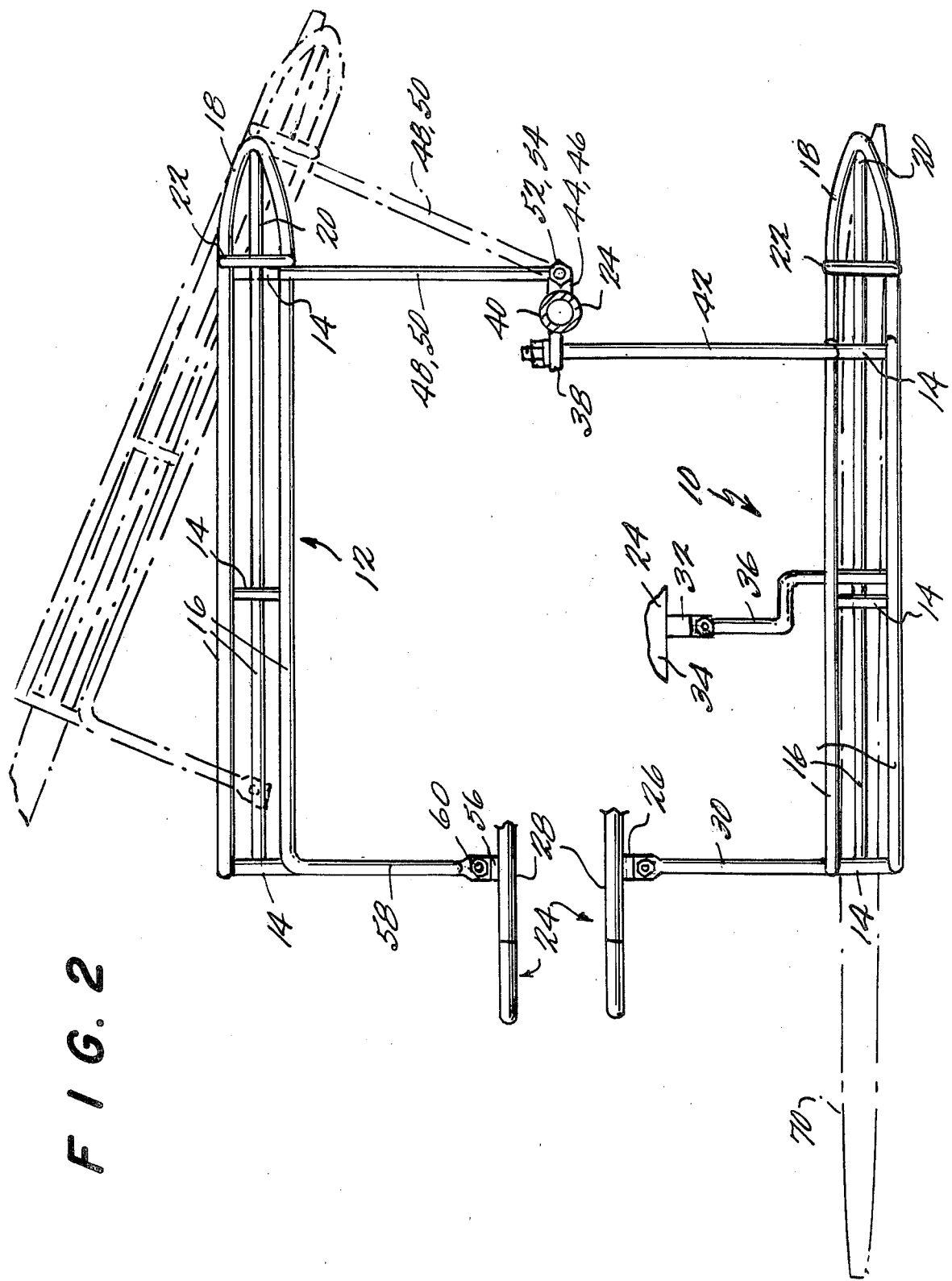
FIG. 2 is a sectional view of the present invention taken along the 2—2 line of FIG. 1 with only appropriate portions of a motorcycle illustrated to indicate the manner of attachment of the present invention to a motorcycle.
Figure 3:
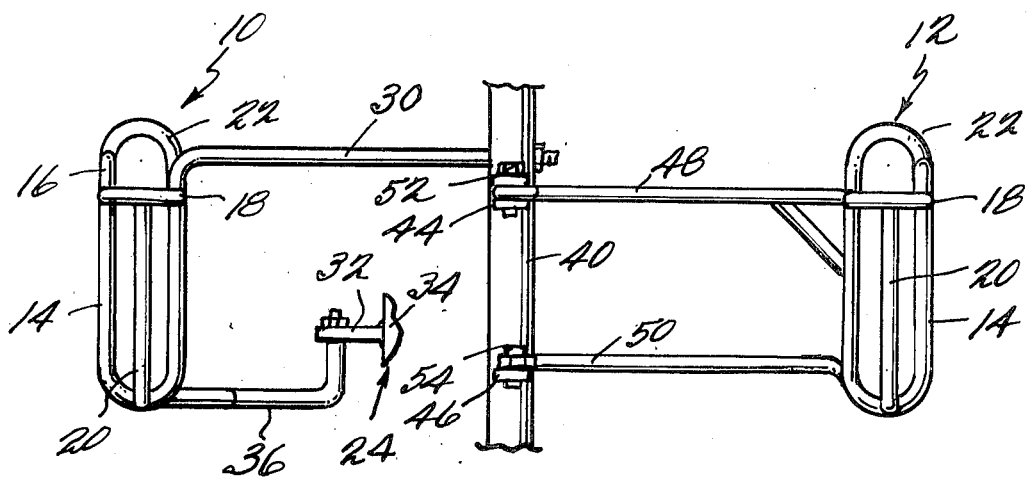
FIG. 3 is a front elevational view of the present invention with portions of a motorcycle illustrated to indicate the manner of attachment of the present invention to a motorcycle.

As illustrated in FIGS. 1-3, the preferred embodiment of the present invention includes supports 10 and 12, each for receiving a surfboard. Support 10 includes three U-shaped frame members 14 interconnected at three corresponding points by horizontal frame members 16. At the front of support 10 is a generally U-shaped retaining member 18 which extends generally horizontally and has two legs connected by a bight portion. Reinforcement 20 assists in maintaining retaining member 18 horizontal. Also attached to support 10 is U-shaped retaining member 22 which is disposed in a generally vertical plane and also has two legs connected by a bight portion.

Support 10 is attached to motorcycle 24 at three points. A bracket 26 is attached to the seat frame 28 of motorcycle 24. Connecting member 30 extends from the upper rear portion of support 10 toward bracket 26 and is bolted thereto. Bracket 32 is welded to frame 34 behind the muffler of motorcycle 24. Connecting member 36 extends from the lower central portion of support 10 and is bolted to bracket 32. Finally, bracket 38 is welded to frame member 40 of motorcycle 24 and connecting member 42 is bolted thereto. Obviously, if a permanent connection is desired, connecting members 30, 36 and 42 may be welded directly to the motorcycle frame.

Whereas support 10 is fixed in position with respect to motorcycle 24, support 12 is pivotal. As with support 10, support 12 includes three U-shaped frame members 14, three horizontal frame members 16, horizontal U-shaped retaining member 18, reinforcement 20, and vertical U-shaped retaining member 22.

The most significant difference between support 10 and support 12 is the manner in which support 12 is attached to motorcycle 24. Thus, brackets 44 and 46 are welded to frame 40 of motorcycle 24. Connecting members 48 and 50 extend, respectively, from the upper and lower portions of the front of support 12, and are respectively pivotally connected to brackets 44 and 46 by means of bolts 52 and 54. If support 10 is to pivot properly, bolts 52 and 54 must be coaxial.

Bracket 56 is welded to seat frame 28 of motorcycle 24. Connecting member 58 extends from the upper rear portion of support 12 and is bolted or pinned to bracket 56 by means of bolt or pin 60. By removing bolt or pin 60, support 12 can pivot about the axis defined by bolts 52 and 54.

Figure 4:
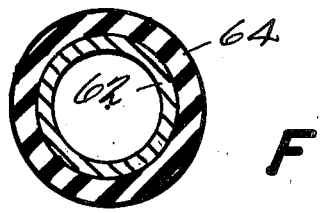
FIG. 4 is a sectional view of any of the frame members of the present invention.

So as to protect any surfboard placed in support 10 or 12, members 14, 16, 18, 20 and 22 are all formed of ½ inch EMT conduit pipe 62 (see FIG. 4), covered with a rubber tubing 64 having a diameter of ½ inch and a thickness of 3/8 inch. Rubber tubing 64 is glued onto pipes 62 to protect against scratches or any other damage to the surfboard or to the driver & passenger against metal.

Figure 5:
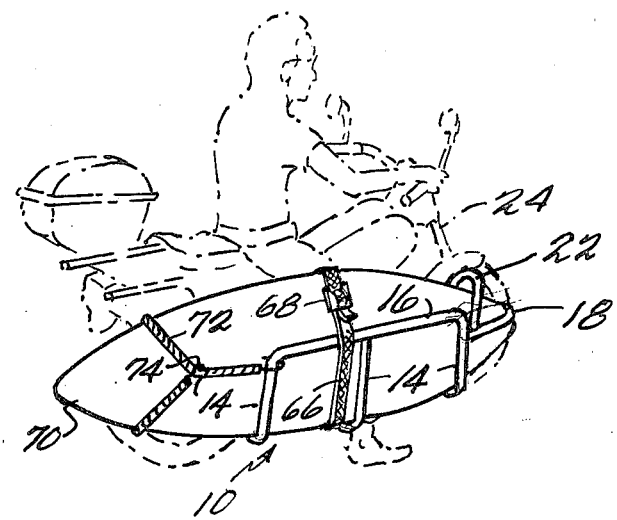
FIG. 5 illustrates the present invention attached to a motorcycle with a surfboard inserted.

As illustrated in FIG. 5, also included with each support 10 and 12 is a strap 66 having a quick release fastener 68. In the preferred embodiment, strap 66 is not connected to any support. However, as will be understood by those skilled in the art, instead of completely encircling support 10, strap 66 may be fastened to horizontal frame members 16. The purpose of strap 66 is to prevent surfboard 70 from coming upward out of the support.

Also included with each support is a cord 72. One end of this cord is attached to support 10 or 12 and the other end wraps around the end of surfboard 70. The purpose of cord 72 is to prevent surfboard 70 from sliding rearwardly out of the support. In the preferred embodiment, cord 72 is elastic. In fact, in the preferred embodiment, each end of cord 72 has a hook 74. One hook 74 engages support 10 or 12. The other hook 74 engages cord 72 after cord 72 is wrapped around the end of surfboard 70.

As indicated above, each support 10 and 12 can carry a surfboard. The capacity of the present invention can be further increased by widening the distance between the parallel portions of U-shaped members 14. If this is accomplished, each support 10 and 12 can carry two surfboards.

It will be perfectly clear to those skilled in the art that it is not necessary to have both supports 10 and 12. If desired, only a single support may be attached to the motorcycle in either a fixed or a pivotal manner. The primary purpose for the pivoting of support 12 is to allow an operator to mount motorcycle 24. If only a single support is attached to the motorcycle, it need not pivot since the motorcycle can be mounted from the open side.

To use the present invention, one or more surfboards are rested in either one or both of supports 10 and 12 with the forward tip of the surfboard inserted under U-shaped restraining member 22. In fact, with typical, narrow surfboards, the forward tip of the surfboard will even fit under U-shaped restraining member 18 on one side of reinforcement 20. Wider or more unusually shaped surfboards will not fit under U-shaped support member 18, and thus will be restrained from forward movement by U-shaped retraining member 22 alone. Strap 66 is then fastened around support 10 or 12 and the surfboard. Finally, cord 72 is wrapped around the end of the surfboard and hooked. In this manner, restraining members 18 and 22 prevent the surfboard from sliding forward out of the rack, strap 66 prevents the surfboard from coming upward out of the rack and cord 72 prevents the surfboard from sliding rearwardly out of the rack.

Then the operator releases pin or bolt 60 if it is not already released and swings pivotal support 12 out of his way. After the operator has mounted the vehicle, pin or bolt 60 is employed to fasten the rear end of support 12 in the proper position. When both supports are in place, the operator is free to drive the vehicle. Because the operator's legs are between the surfboard and the motorcycle, the surfboard and supports 10 and 12 help protect the operator, improving the safety of operating the two-wheeled vehicle. Furthermore, since it is so easy and quick to position the surfboard on the rack, the rack will be readily accepted by the surfing community.

What is claimed is:

1. A rack for carrying a surfboard on edge longitudinally on a two-wheeled vehicle comprising:
   longitudinally extending frame means having a U-shaped end view transverse to the longitudinal extent of said frame means for receiving said surfboard;
   means for attaching said frame means to a side of said vehicle;
   a first U-shaped restraining member having two legs connected by a bight portion, said legs extending from an end of said frame means so that said bight portion extends transverse to said longitudinal extent of said frame means;
   a second U-shaped restraining member having two legs connected by a bight portion, said legs of said second restraining member extending generally upwardly from adjacent said first restraining member so that the respective bight portions of the first and second restraining members function to prevent said surfboard from sliding forward with respect to said vehicle;
   means for preventing said surfboard from moving upward out of said frame means; and
   means for preventing said surfboard from moving rearwardly with respect to said vehicle out of said frame means.

2. A set of racks for carrying two surfboards on a two-wheeled vehicle comprising:
   two longitudinally extending frame means each having a U-shaped end view transverse to the longitudinal extent of the respective frame means and each for receiving one of said surfboards horizontally on edge;
   means for attaching said first means to opposite sides of said vehicle;
   two first U-shaped restraining members, each having two legs connected by a bight portion, said legs of each of said first restraining members extending from an end of one of said frame means, respectively, so that each said bight portion extends transverse to said longitudinal extent of an associated said frame means;
   two second U-shaped restraining members, each having two legs connected by a bight portion, said legs of each of said second restraining members extending generally upwardly from adjacent an associated said first restraining member so that the respective bight portions or associated first and second restraining members function to prevent said surfboards from sliding forward with respect to said vehicle;
   two means, each for preventing one of said surfboards from moving rearwardly with respect to said vehicle out of one of said frame means, respectively.

3. A rack as in claim 1 or 2 wherein said frame means includes:
   at least two U-shaped frame members; and
   a plurality of horizontal frame members connected to corresponding portions of said U-shaped frame members.

4. A rack as in claim 1 or 2 wherein said upward movement preventing means includes an adjustable strap cooperating with said frame means for preventing said surfboard from moving upward out of said frame means.

5. A rack as in claim 4 wherein each said upward movement preventing means further comprises quick release means for quickly releasing said strap from retaining said surfboard.

6. A rack as in claim 1 or 2 wherein each said rearward movement preventing means includes a web attachable to said frame means and adapted for engagement for an end of surfboard for preventing said surfboard from moving rearwardly with respect to said vehicle out of said frame means.

7. A rack as in claim 6 wherein said web is elastic.

8. A rack as in claim 7 further comprising hooks on the ends of said elastic web, one hook adapted for engagement with said frame means and the other hook adapted for engagement with said elastic web for forming a loop adapted to receive said surfboard end.

9. A rack as in claim 1 or 2 wherein said attaching means includes means for pivotally attaching said frame means to said vehicle.

10. A rack as in claim 1 or 2 further comprising padding disposed on said first frame means and said first and second restraining members.

11. A rack as in claim 10 wherein said padding is made or rubber.

12. A rack for carrying a surfboard on edge longitudinally on a two-wheeled vehicle comprising:
    at least two U-shaped frame members;
    a plurality of horizontal frame members connected to corresponding portions of said U-shaped frame members, said U-shaped frame members and said horizontal frame members forming a longitudinally extending support for receiving said surfboard;
    means for pivotally attaching said support to a side of said vehicle;
    a first U-shaped restraining member having two legs connected by a bight portion, said legs extending from the front one, with respect to said vehicle, of said U-shaped frame members so that said bight portion extends transverse to said longitudinal extent of said support;
    a second U-shaped restraining member having two legs connected by a bight portion, said legs of said second restraining member extending generally upwardly from adjacent said first restraining member so that the respective bight portions of the first and second restraining members function to prevent said surfboard from sliding forward with respect to said vehicle;
    a strap cooperating with said support for preventing said surfboard from moving upward out of said support;

quick release means for quickly releasing said strap from retaining said surfboard; and elastic means adapted to wrap around the end of said surfboard and cooperating with said support for preventing said surfboard from moving rearwardly with respect to said vehicle out of said support.

13. A set of racks for carrying two surfboards on edge longitudinally on a two-wheeled vehicle comprising:

two groups of at least two U-shaped frame members;

two groups of a plurality of horizontal frame members, said horizontal frame members of each group connected to corresponding portions of one of said groups of said U-shaped frame members, respectively, each of said groups of said U-shaped frame members and associated said horizontal frame members forming a longitudinally extending support for receiving a surfboard;

means for attaching said supports to opposite sides of said vehicle, said attaching means including means for pivotally attaching at least one of said supports;

two first U-shaped restraining members, each having two legs connected by a bight portion, said legs extending from the front one, with respect to said vehicle, of said U-shaped frame members on opposite sides of said vehicle so that each said bight portion extends transverse to said longitudinal extent of an associated one of the supports;

two second U-shaped restraining members, each having two legs connected by a bight portion, said legs of each of said second restraining members extending generally upwardly from adjacent an associated said first restraining member so that the respective bight portion of associated first and second restraining members function to prevent said surfboards from sliding forward with respect to said vehicle;

two straps, each cooperating with one of said supports, respectively, for preventing said surfboards from moving upward out of said supports;

quick release means for quickly releasing said straps from retaining said surfboards; and two elastic means, each adapted to be wrapped around the end of one of said surfboards, respectively, and each cooperating with one of said supports, respectively, for preventing said surfboards from moving rearwardly with respect to said vehicle out of said supports.

14. A rack as in claim 12 or 13 further comprising hooks attached to the ends of each of said elastic means, one of said hooks being adapted to engage said support and the other of said hooks being adapted to engage said elastic means for forming a loop adapted to engage an end of said surfboard.

15. A rack as in claim 12 or 13 wherein said U-shaped frame members, horizontal frame members, each first U-shaped restraining member and each second U-shaped restraining member includes padding.

16. A rack as in claim 15 wherein said padding is made of rubber.

* * * * *